April 25, 1961  E. B. NOLT  2,981,173
HAY BALER
Filed July 23, 1958  3 Sheets-Sheet 2

INVENTOR
*EDWIN B. NOLT*
BY
*Joseph Allen Brown*
ATTORNEY

April 25, 1961     E. B. NOLT     2,981,173
HAY BALER
Filed July 23, 1958     3 Sheets-Sheet 3
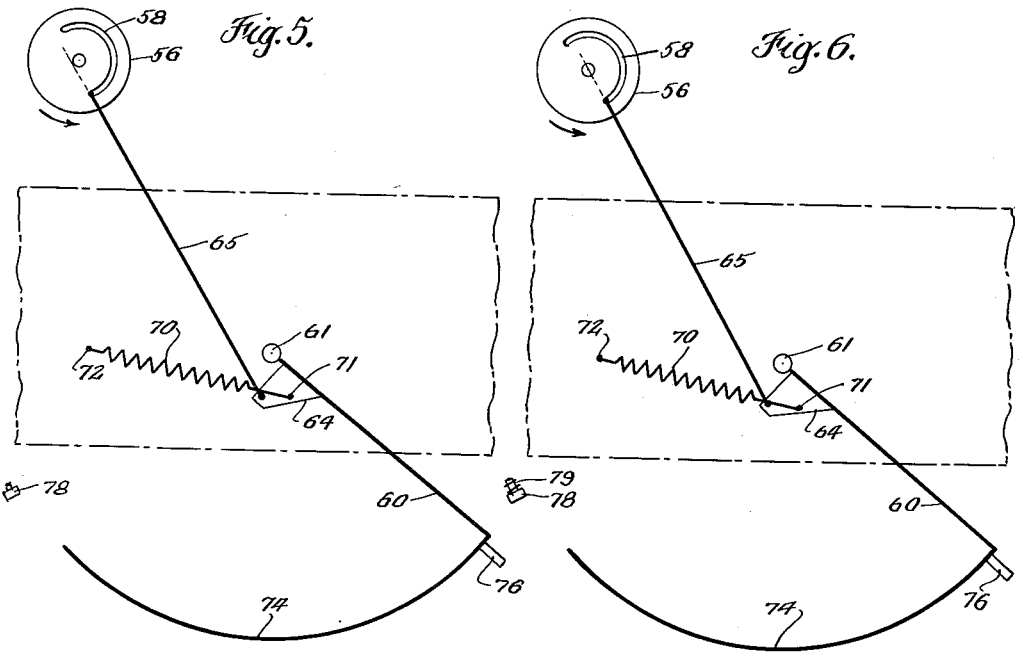
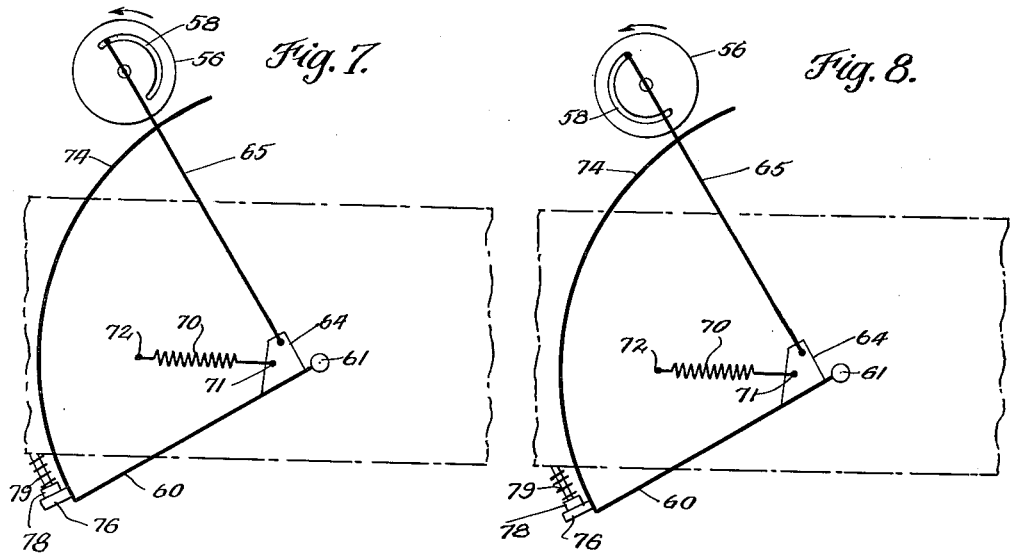
INVENTOR
EDWIN B. NOLT
BY
Joseph Allen Brown
ATTORNEY United States Patent Office 2,981,173
Patented Apr. 25, 1961

2,981,173

HAY BALER

Edwin B. Nolt, New Holland, Pa., assignor to Sperry Rand Corporation, New Holland, Pa., a corporation of Delaware Filed July 23, 1958, Ser. No. 750,492

6 Claims. (Cl. 100—19)

This invention relates generally to automatic hay balers and more particularly to an improved needle drive mechanism therefor.

Automatic hay balers operate at high speed. A bale forming plunger may be reciprocated at sixty strokes per minute, for example, with the tying operation taking place between successive working strokes of the plunger. At the completion of each bale, a very short time interval is provided during which needles must project a tying medium across the bale case and then return. On a working stroke the needles pass through suitable slots in the plunger. To give the tying mechanism as much time as possible to operate, it is desirable that the needles be projected at high speed to get the tying medium quickly to the tier, then to dwell in projected position before returning to a position of rest. The dwell renders less critical the timing involved in the operation of the tying mechanism. Further, if the tying medium can be projected across the bale case at high speed and then dwell, the timing of the plunger can be so related to the projection of the needles that the tying operation can be started while the bale is held under compression by the plunger. Thus a more compact bale can be produced.

One object of this invention is to provide an improved simplified needle drive mechanism which will project a needle across a bale case at high speed, allow the needle to dwell in projected position, and then return the needle to its original position.

Another object of this invention is to provide a unitary drive mechanism which includes primary and secondary drive means cooperative to obtain a desired operation of the needles.

A further object of this invention is to provide a needle drive mechanism of the character described which may be manufactured and assembled at low cost.

Other objects of this invention will be apparent hereinafter from the specification and from the recital in the appended claims.

In the drawings:

Figs. 5–8 are diagrammatic views illustrating the operation of the needle drive mechanism of this invention.

Figure 1:
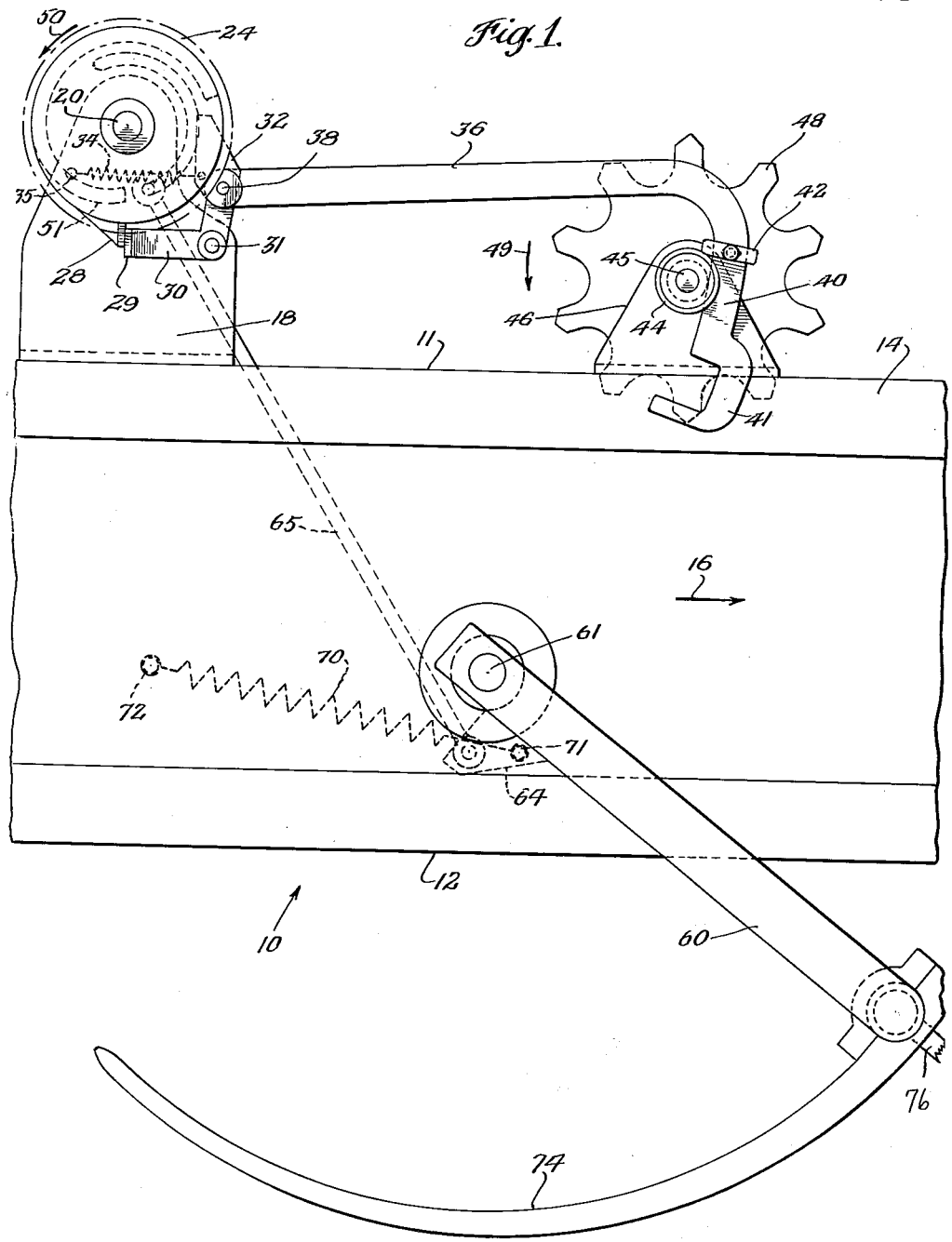
Fig. 1 is a fragmentary side elevation of a hay baler having a needle drive mechanism constructed according to this invention, the needles driven by the mechanism being shown in retracted, at-rest position, and certain parts of the baler structure being omitted for purposes of clarity.
Figure 2:
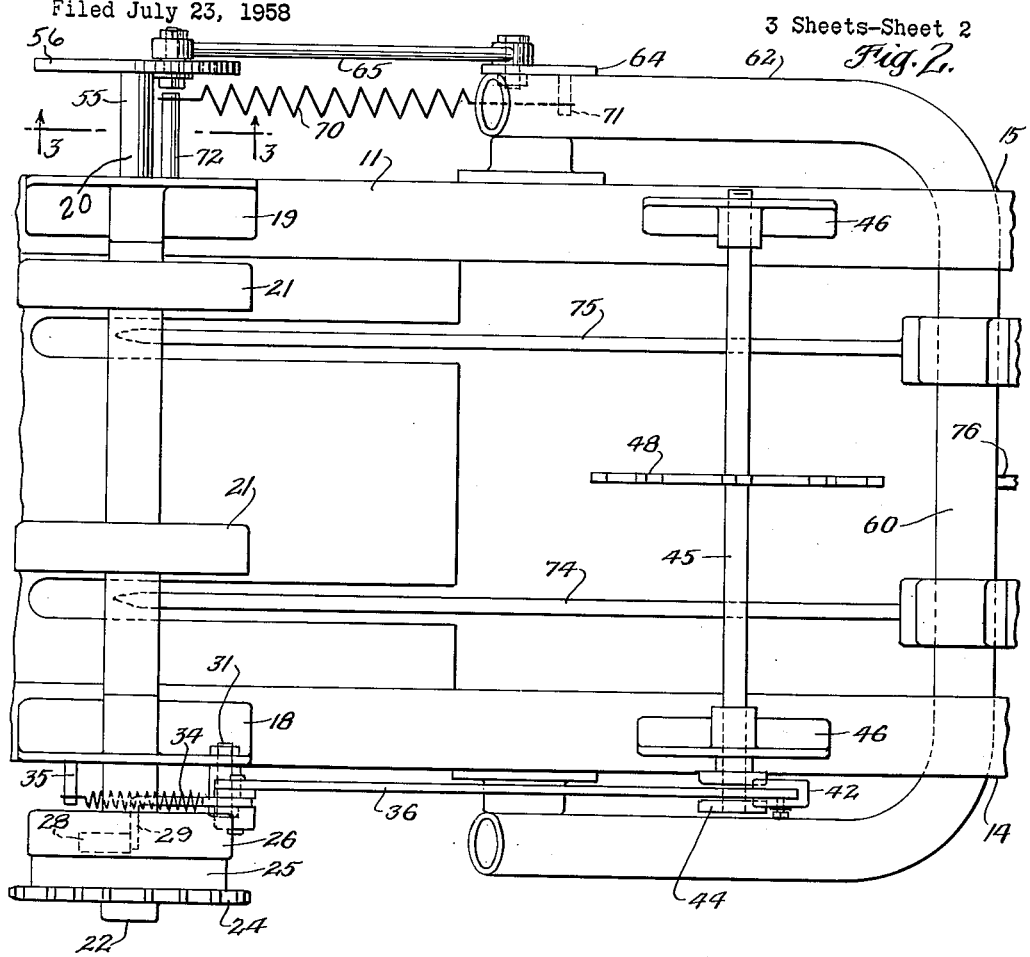
Fig. 2 is a plan view of Fig. 1.

Referring now to the drawings by numerals of reference and particularly to Figs. 1 and 2, 10 denotes an elongate, rectangular bale case having a top wall 11, bottom wall 12 and side walls 14 and 15. Reciprocable in the bale case is a plunger, not shown, which operates to compress hay into bales. Each bale as it is formed in the bale case moves in the direction indicated by the arrow 16, in Fig. 1.

Mounted on top wall 11 in laterally spaced relation are pedestal-bearings 18 and 19 which support a cross-shaft 20. Cross-shaft 20 is adapted to carry tying devices, not shown, of conventional construction. The tying devices are operated by cam-gears indicated at 21.

Shaft 20 projects at each end beyond side walls 14 and 15. One axial end 22 of the shaft has a sprocket 24 normally freely rotatable thereon. Sprocket 24 is continuously driven from the same source of power that drives the bale plunger. The sprocket has a constantly driven member 25 which together with an intermittently rotatable member 26 constitute a one-revolution clutch. Member 26 is affixed to shaft 20 and is connectable to member 25 through conventional clutching means including a pawl 28 carried on member 26 and biased toward a position wherein it is connected to the member 25. Pawl 28 is normally held in an inoperative position by a detent 29.

Detent 29 is disposed at one end of a bell crank 30 pivotally mounted at 31 on pedestal bearing 18. The opposite end of the bell crank has an abutment 32 to which one end of a spring 34 is attached. The opposite end of spring 34 is connected to a pin 35 projecting outwardly from pedestal-bearing 18. As shown in Fig. 1, spring 34 constantly tends to pivot the bell crank 30 in a counterclockwise direction about the pivot 31 and thereby swing the detent 29 downwardly and out of engagement with the pawl 28. Such pivoting is controlled by a trip arm 36 pivotally connected by pin 38 to the bell crank 30.

Trip arm 36 extends rearwardly relative to the bale case 10 having a downwardly projecting portion 40 at its rearward end. Portion 40 has a U-shaped pocket 41 opened forwardly, and an adjustable stop member 42. The trip arm extends over and against a trip roller 44 affixed to a shaft 45 rotatably supported on pedestal-bearings 46. Disposed medially on shaft 45 and affixed thereto is a metering or star wheel 48 of such diameter that it projects downwardly below the top wall 11 of bale case 10 for engagement with the bales formed in the bale case. As the bales in the bale case move rearwardly, the metering wheel is rotated as indicated by the arrow 49 in Fig. 1.

When metering wheel 48 is rotated responsive to bale movement, the roller 44 is correspondingly rotated. The rotation of the roller imparts a lifting movement to the trip arm 36, the portion 40 moving upwardly and pivoting about pin 38. All the while, trip arm 36 is biased or spring loaded forwardly, toward the left of Fig. 1, by the spring 34 which maintains portion 40 against roller 44. When the pocket 41 comes into register with roller 44, spring 34 is able to become effective to pull the trip arm 36 to the left whereupon the legs of U-shaped pocket 41 straddle the roller 44. When the trip arm 36 is shifted forwardly, bell crank 30 is pivoted counter-clockwise about pivot pin 31 and the detent 29 is swung downwardly. Pawl 28 is thus released and becomes operative in conventional manner to connect the clutch elements 25 and 26. The driven clutch element 26 is rotated as indicated by the arrow 50 in Fig. 1.

A cam surface 51 is provided on clutch member 26 whereby as the clutch member rotates, the surface 51 strikes the abutment 32 on the bell crank and pivots it in a clockwise direction to return it to the position shown in Fig. 1. Thus, when the clutch element completes one revolution, the detent 29 will be disposed in the path of pawl 28 causing it to be disconnected from the member 25 thereby returning the parts to their original position. At the same time, when cam 51 strikes the abutment 32, it shifts the trip arm 36 rearwardly or to the right of Fig. 1 removing the roller 44 from the pocket 41 and allowing the trip arm 36 to pivot about pin 38 and drop to the position shown in Fig. 1. When the trip arm drops, the stop 42 comes into engagement with the roller 44 to reset the device. With the formation of the next bale in the bale case 10, the metering wheel 48 is again rotated to meter the formation of the bale and reinstitute the intermittent operation of the one revolution clutch.

It is thus seen that shaft 20 is rotated intermittently one revolution. The details of the clutch mechanism and the surrounding operative structure are only generally shown since such is conventional and plays no part in the present invention. The invention resides in the mechanism for projecting the needles into and out of the bale case upon each revolution of the shaft 20. Such structure will now be described.

Figure 3:
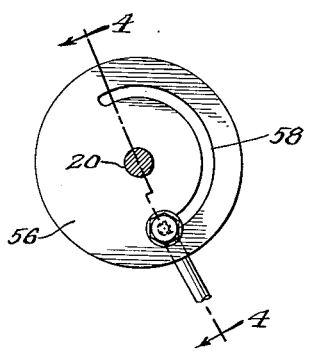
Fig. 3 is a fragmentary section taken on the line 3—3 of Fig. 2 and looking in the direction of the arrows.
Figure 4:
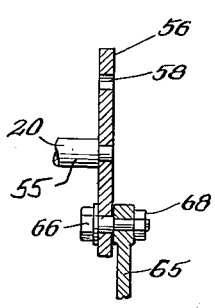
Fig. 4 is a section taken on the line 4—4 of Fig. 3 and looking in the direction of the arrows.

One axial end 55 of shaft 20 projects beyond side wall 15 of the bale case 10. Affixed thereto is a primary drive member 56 (Figs. 2-4) in the form of a disc the axis of which is concentric with the axis of the shaft 20. Disc 56 has a concentric slot 58 of approximately 185°.

Straddling bale case 10 is a needle yoke 60 pivotally connected at its respective ends by pins 61 to the side walls of the bale case. One leg 62 (Fig. 2) of the yoke has an angular plate 64 welded to it, to which one end of a lever arm 65 is pivotally connected. The opposite end of the lever arm is connected to primary drive member 56 by a bolt 66, which projects through the slot 58, and has a nut 68 threaded on it. The projection of bolt 66 through slot 58 provides a lost-motion connection between the lever arm and drive member.

Also connected to plate 64 is one end of a spring 70 mounted between a pin 71 projecting laterally from plate 64 and a pin 72 welded to and projecting from the adjacent side wall 15 of the bale case. Spring 70 is under tension when the needle yoke is in normal retracted position.

Mounted on the bight of yoke 60 are arcuate needles 74 and 75 adapted to project a tying medium across the bale case, from the bottom to the top thereof, and deliver such tying medium to the tying devices carried on the shaft 20. Affixed between the needles 74 and 75 on the needle yoke is a stop member 76 movable with the yoke. Stop 76 is engageable with a bumper 78 of a brake 79 illustrated diagrammatically in Figs. 5-8.

*Operation*

When the yoke 60 is in normal position as shown in Figs. 1, 2 and 5, the needles 74 and 75 are positioned at rest outside of the bale case 10 and alongside the bottom wall 12. The at-rest position of the shaft 20 and the disposition of the slot 58 is such that the lever arm 65 extends as shown in Fig. 5 and to the left of center of the shaft 20. Spring 70 constantly urges the yoke 60 to pivot in a clockwise direction to project the needles through the bale case. However, such pivoting is resisted by the lever arm 65 abutting against drive member 56. The lever arm provides a detent for holding the needles in at-rest position.

However, when the metering mechanism operates to pivot the bell crank 30 to allow the engagement of the one revolution clutch so that shaft 20 will rotate one revolution, the primary drive member or disc 56 will rotate counterclockwise. The extension of the lever arm will first approach the center of shaft 20, as shown in Fig. 6, and then pass over-center. Once the lever arm 65 passes over-center, the spring 70 is able to become effective and swings the needle yoke and needles at high speed in a clockwise direction projecting the needles to the position shown in Fig. 7. The bolt 66 slides in the slot 58 from one end thereof toward the opposite end of the slot. When the needle yoke approaches its fully projected position, the stop member 76 engages the bumper 78 of the brake member 79 to thereby gradually bring the needles to a projected stop position. Further, as noted in Fig. 7, the movement of the bolt 66 in the slot 58 is stopped before it comes to the dead end of the slot 58. Thus, the stopping loads imposed by the needle mechanism are taken by the brake 79 and not by the primary drive member 56.

When the parts are disposed as shown in Fig. 7, the needles temporarily remain stationary and projecting through the bale case, thereby providing a dwell. The needles remain in this position until the rotation of the disc brings the other end of the slot around to the point where it engages the bolt 66 as shown in Fig. 8 to thereby institute the retraction of the needles from the bale case and back to the position shown in Fig. 5.

In the absence of slot 58, a positive drive would be provided between the primary drive member 56 and the needles. The needles would be projected into and out of the bale case at a fixed rate. However, because of the slot 58 and the over-center disposition of the lever arm 65 relative to shaft 20 when the needle yoke is retracted, and because of the constant biasing of the needle yoke toward projected position by the spring 70, once rotation of shaft 20 begins, the lever arm passes over-center and the spring becomes effective to quickly swing the needles through the bale case. The time gained can be advantageously used to start the tying operation while the just completed bale is held by the plunger, enabling the baler to produce more compact, denser bales.

The structure thus described is simple and low cost. The parts are easily fabricated involving far less expense than when cam means is employed to achieve a desired operation of a needle mechanism.

While this invention has been described in connection with a particular embodiment thereof, it will be understood that it is capable of further modification, and this application is intended to cover any variations, uses, or adaptations of the invention following, in general, the principles of the invention and including such departures from the present disclosure as come within known or customary practice in the art to which the invention pertains and as fall within the scope of the invention or the limits of the appended claims.

Having thus described my invention, what I claim is:

1. An improvement in a hay baler having a bale case, a needle mounted on said bale case for movement relative thereto, said needle having a position of rest at one side of said bale case, and means for moving said needle in one direction to project the needle across said bale case to the side thereof opposite said one side, for allowing said needle to dwell in projected position, and then for moving the needle in the opposite direction to return it to said position of rest, the improvement residing in said moving means which comprises a drive member, lost-motion connection means between said drive member and said needle, said drive member providing the initial movement of said needle in said one direction, and secondary means operable subsequent to said initial movement for driving the needle to overrun said drive member when the needle is moving in said one direction.

2. An improvement in a hay baler as recited in claim 1 wherein said drive member comprises a disc, and said lost-motion connection means comprising a lever arm having one end connected to said needle and an end opposite said one end connected to said disc, said disc having a slot and said lever opposite end being slidable in said slot.

3. An improvement in a hay baler as recited in claim 2 wherein said secondary driving means comprises a spring biasing said needle in said one direction.

4. An improvement in a hay baler as recited in claim 3 wherein said lever opposite end is disposed in one end of said slot when said needle is in said position of rest, said spring shifting said lever opposite end to the other end of said slot when said needle is moved across said bale case.

5. An improvement in a hay baler as recited in claim 1 wherein a brake is provided for cushioning said needle when it approaches said projected position.

6. In a hay baler having a bale case and a needle mounted thereon for movement in one direction from a position of rest to a position projecting across said bale case, and then in an opposite direction to return, the combination of a unitary drive mechanism for said needle including a primary drive for moving said needle in both directions, and a secondary drive operative to drive said needle in said one direction only.

References Cited in the file of this patent

UNITED STATES PATENTS

| | | |
|---|---|---|
| 497,039 | Wickey | May 9, 1893 |
| 963,180 | Robben | July 5, 1910 |
| 2,030,031 | Innes | Feb. 4, 1936 |
| 2,520,800 | Fraser | Aug. 29, 1950 |
| 2,575,538 | Tuft | Nov. 20, 1951 |